US012710501B2

(12) United States Patent
Henry et al.

(10) Patent No.: US 12,710,501 B2
(45) Date of Patent: Aug. 18, 2026

(54) HYBRID RANGING

(71) Applicant: Cisco Technology, Inc., San Jose, CA (US)

(72) Inventors: Jerome Henry, Pittsboro, NC (US); Robert E. Barton, Richmond (CA); Matthew Aaron Silverman, Shaker Heights, OH (US); Vishal Satyendra Desai, Milpitas, CA (US); Pooya Monajemi, Irvine, CA (US)

(73) Assignee: Cisco Technology, Inc., San Jose, CA (US)

( * ) Notice: Subject to any disclaimer, the term of this patent is extended or adjusted under 35 U.S.C. 154(b) by 1312 days.

(21) Appl. No.: 17/192,434

(22) Filed: Mar. 4, 2021

(65) Prior Publication Data

US 2022/0283258 A1 Sep. 8, 2022

(51) Int. Cl.

*G01S 3/74* (2006.01)
*G01S 13/87* (2006.01)
*H04W 64/00* (2009.01)
*H04W 84/12* (2009.01)

(52) U.S. Cl.

CPC .............. *G01S 3/74* (2013.01); *G01S 13/876* (2013.01); *H04W 64/00* (2013.01); *H04W 84/12* (2013.01)

(58) Field of Classification Search

CPC ...... G01S 3/74; G01S 13/876; G01S 5/02521; H04W 64/00; H04W 84/12

See application file for complete search history.

(56) References Cited

U.S. PATENT DOCUMENTS 8,370,629 B1 2/2013 Ngo et al.
10,728,872 B1 7/2020 Guday et al.
2009/0154371 A1* 6/2009 Alizadeh-Shabdiz ........................ G01S 5/02521 370/252
2015/0234033 A1* 8/2015 Jamieson .................. G01S 3/12 455/456.1
2016/0037370 A1* 2/2016 Futaki ................... H04W 16/18 370/252
2016/0198429 A1 7/2016 Prechner et al.
2018/0249437 A1* 8/2018 Lindskog .............. G01S 13/878
2019/0305813 A1* 10/2019 Zhang ...................... H04B 7/04
2020/0053740 A1 2/2020 Wigren et al.
2022/0299617 A1* 9/2022 Ahmed ............... H04W 72/542

OTHER PUBLICATIONS

Banin, Leor et al. "WiFi FTM and MAP Information Fusion for Accurate Positioning", 2016 International Conference on Indoor Positioning and Indoor Navigation (IPIN), Oct. 4-7, 2016, Alcalá de Henares, Spain (4 pages).

* cited by examiner

*Primary Examiner* — Saba Dagnew
(74) *Attorney, Agent, or Firm* — Merchant & Gould P.C.

(57) ABSTRACT

Hybrid ranging may be provided. A coverage environment may be divided into a plurality of areas and a corresponding plurality accuracy gradients for each of the plurality of areas may be determined. Passive ranging may be implemented for ones of the plurality of areas that have a high accuracy gradient and one of a high client device density and low client device movement. Active ranging may be implemented for ones of the plurality of areas that have a low client device density. Based on at least one of a level of client device density and movement speed of client devices, switching may be performed between passive ranging and active ranging for ones of the plurality of areas that have at least one of high client device density and high client device movement.

20 Claims, 5 Drawing Sheets

11k measurements request, type FTM (introduced recently in 802.11md)

| FTM-able APs (please go FTM to them and report) Ap5 (ch 36) | Ap8 (ch 161) |
| --- | --- |

HYBRID RANGING

TECHNICAL FIELD

The present disclosure relates generally to client device ranging.

BACKGROUND

In computer networking, a wireless Access Point (AP) is a networking hardware device that allows a Wi-Fi compatible client device to connect to a wired network and to other client devices. The AP usually connects to a router (directly or indirectly via a wired network) as a standalone device, but it can also be an integral component of the router itself. Several APs may also work in coordination, either through direct wired or wireless connections, or through a central system, commonly called a Wireless Local Area Network (WLAN) controller. An AP is differentiated from a hotspot, which is the physical location where Wi-Fi access to a WLAN is available.

Prior to wireless networks, setting up a computer network in a business, home, or school often required running many cables through walls and ceilings in order to deliver network access to all of the network-enabled devices in the building. With the creation of the wireless AP, network users are able to add devices that access the network with few or no cables. An AP connects to a wired network, then provides radio frequency links for other radio devices to reach that wired network. Most APs support the connection of multiple wireless devices. APs are built to support a standard for sending and receiving data using these radio frequencies.

BRIEF DESCRIPTION OF THE FIGURES

The accompanying drawings, which are incorporated in and constitute a part of this disclosure, illustrate various embodiments of the present disclosure. In the drawings.

DETAILED DESCRIPTION

Overview

Figure 1:
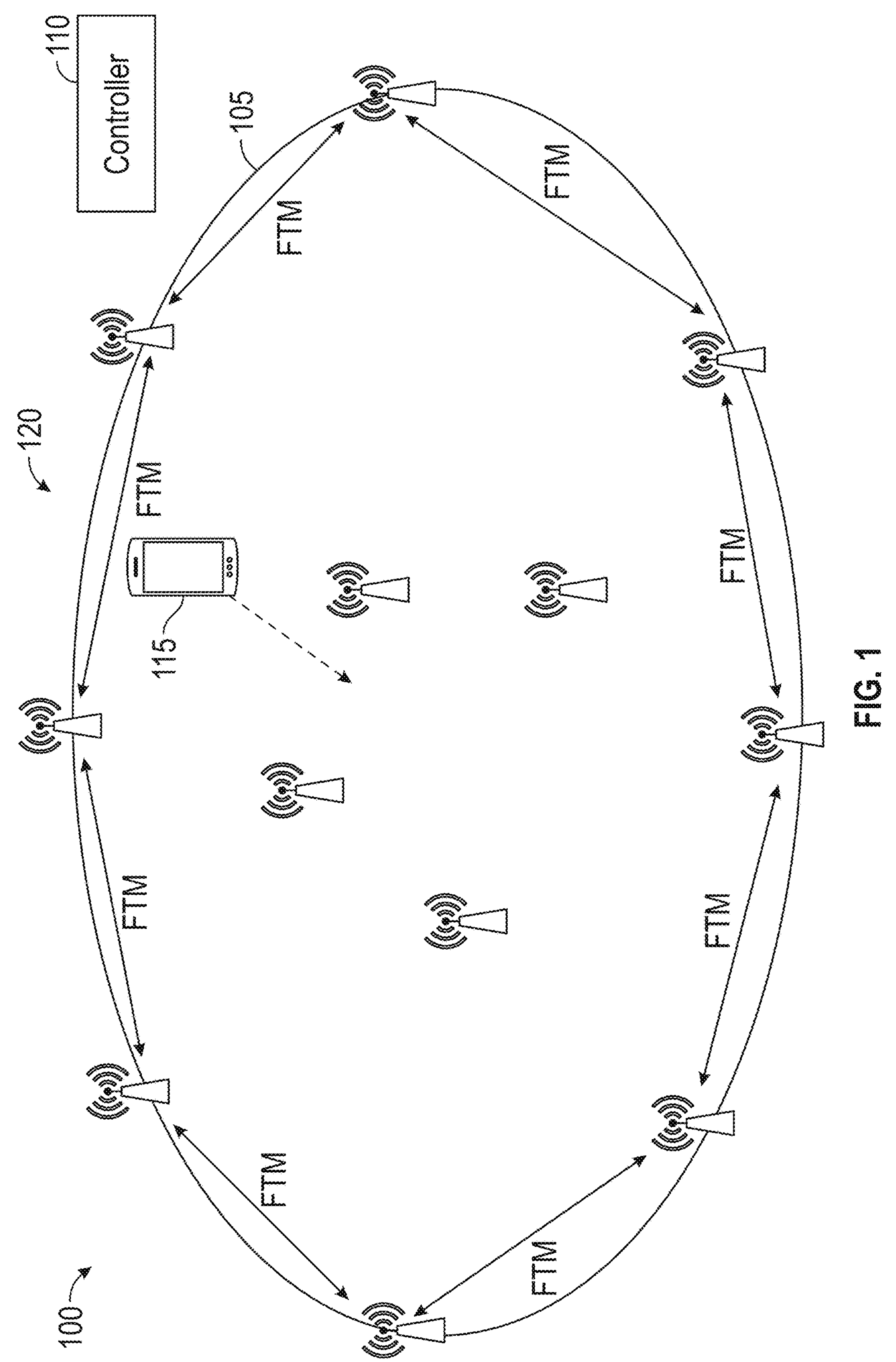
FIG. 1 is a block diagram of an operating environment for providing hybrid ranging.

Hybrid ranging may be provided. A coverage environment may be divided into a plurality of areas and a corresponding plurality accuracy gradients for each of the plurality of areas may be determined. Passive ranging may be implemented for ones of the plurality of areas that have a high accuracy gradient and one of a high client device density and low client device movement. Active ranging may be implemented for ones of the plurality of areas that have a low client device density. Based on at least one of a level of client device density and movement speed of client devices, switching may be performed between passive ranging and active ranging for ones of the plurality of areas that have at least one of high client device density and high client device movement.

Both the foregoing overview and the following example embodiments are examples and explanatory only, and should not be considered to restrict the disclosure's scope, as described and claimed. Furthermore, features and/or variations may be provided in addition to those described. For example, embodiments of the disclosure may be directed to various feature combinations and sub-combinations described in the example embodiments.

EXAMPLE EMBODIMENTS

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

The Institute of Electrical and Electronics Engineers (IEEE) 802.11az standard describes location and ranging techniques based on 802.11. These location and ranging techniques comprise an active ranging technique where a client device (i.e., a station (STA)) triggers a Fine Time Measurement (FTM) exchange with an Access Point (AP). These location and ranging techniques also comprise a passive ranging technique where APs exchange ranging messages, and client devices passively monitor these exchanges and use hyperbolic triangulation to determine their own locations for example.

The aforementioned active ranging technique may not scale well because as client device density increases, the FTM exchanges may saturate the channel resources (i.e., cause high Channel Utilization (CU)). The aforementioned passive ranging technique may not benefit the infrastructure because the client devices do not transmit their location and the APs may not know if there are client devices in need of location. Without a feedback process, the client devices may be left to guess their location because if the computation output is wrong, the client devices may have no recourse, and often no knowledge of the error.

Accordingly, embodiments of the disclosure may provide a hybrid location process that may scale while providing feedback to the infrastructure on client device presence and location, and feedback and remediation to the client devices about location inaccuracy. For example, embodiments of the disclosure may provide a hybrid FTM ranging process where a passive ranging technique may be predominantly used in areas where: i) client device density is high (and thus active FTM may cause high CU); and ii) client device movement is low (and thus frequent FTM may not be needed). An active ranging technique may be implemented with increasing periodicity in areas where movement is fast and/or client device count is lower. Consequently, embodiments of the disclosure may limit the effect on the Radio Frequency (RF) performances of active FTM measurements, while maintaining for the client devices, the ability to obtain accurate measurements, but also to suppress FTM exchanges with APs in areas that the infrastructure has determined to be FTM-performance-poor. For the infrastructure, embodiments of the disclosure may provide the ability to know the client device count and location through the activation of active mode and Location Measurement Report (LMR) feedback in critical areas. The infrastructure may use the client device "FTM supported" Information Element (IE) and alike Target Beacon (TB)/non-TB messages to identify client devices supporting the various FTM ranging modes.

FIG. 1 shows an operating environment 100 for providing hybrid ranging. As shown in FIG. 1, operating environment 100 may comprise a coverage environment 105, a controller 110, and a client device 115. Coverage environment 105 may comprise, but is not limited to, a Wireless Local Area Network (WLAN) comprising a plurality of Access Point (APs) 120 that may provide wireless network access (e.g., access to the WLAN) for client devices such as client device 115. Client device 115 may comprise, but is not limited to, a smart phone, a personal computer, a tablet device, a mobile device, a telephone, a remote control device, a set-top box, a digital video recorder, an Internet-of-Things (IoT) device, a network computer, a router, or other similar microcomputer-based device. Plurality of APs 120 may be compatible with specification standards such as the 802.11ax specification standard for example.

Controller 110 may comprise a Wireless Local Area Network controller (WLC) and may provision and control coverage environment 105 (e.g., a WLAN). Controller 110 may allow ones of plurality of APs 120 to join coverage environment 105. In some embodiments of the disclosure, controller 110 may be implemented by a Digital Network Architecture Center (DNAC) controller (i.e., a Software-Defined Network (SDN) controller) that may configure information for coverage environment 105 in order to provide hybrid ranging consistent with embodiments of the disclosure.

The elements described above of operating environment 100 (e.g., controller 110, client device 115, and plurality of APs 120) may be practiced in hardware and/or in software (including firmware, resident software, micro-code, etc.) or in any other circuits or systems. The elements of operating environment 100 may be practiced in electrical circuits comprising discrete electronic elements, packaged or integrated electronic chips containing logic gates, a circuit utilizing a microprocessor, or on a single chip containing electronic elements or microprocessors. Furthermore, the elements of operating environment 100 may also be practiced using other technologies capable of performing logical operations such as, for example, AND, OR, and NOT, including but not limited to, mechanical, optical, fluidic, and quantum technologies. As described in greater detail below with respect to FIG. 5, the elements of operating environment 100 may be practiced in a computing device 500.

Figure 2:
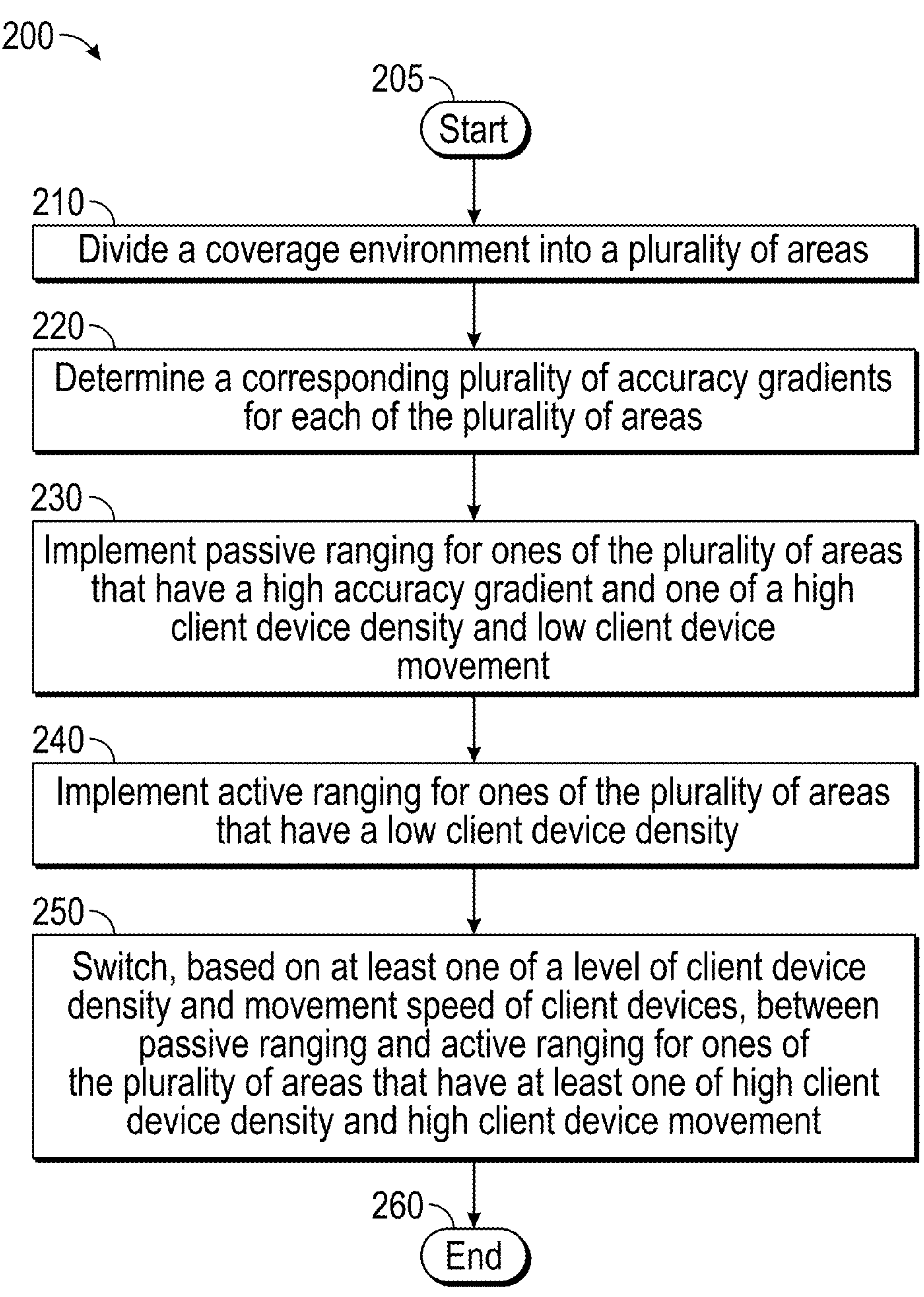
FIG. 2 is a flow chart of a method for providing hybrid ranging.

FIG. 2 is a flow chart setting forth the general stages involved in a method 200 consistent with an embodiment of the invention for providing hybrid ranging. Method 200 may be implemented using controller 110 as described in more detail above with respect to FIG. 1. Ways to implement the stages of method 200 will be described in greater detail below.

Method 200 may begin at starting block 205 and proceed to stage 210 where controller 110 may divide coverage environment 105 into a plurality of areas. These areas with be addressed for a ranging technique as discussed in greater detail below. Initially, the APs may use the constellation technique to limit AP-to-AP exchanges (i.e., the passive ranging technique) at the edge of coverage environment 105 (e.g., WLAN), thus causing the client devices (e.g., client device 115) that enter coverage environment 105 to initiate ranging requests. For example, the APs may use the constellation process or other techniques (FTM self-location, location engine manual input, or other process) to identify the APs at the edge of coverage environment 105. The passive ranging technique may then be activated only between AP pairs along the edge of the coverage environment 105. In another embodiment, the detection of a new association request from a client device at the edge of coverage environment 105 may cause the APs to temporarily stop the passive ranging technique exchanges for a configurable time period. In yet another embodiment, a learning machine, that may be trained with the client device density pattern over time, may predict the client device density at the edge for a particular interval, and may reduce (or interrupt) the passive ranging technique exchanges between APs in range for a configurable time period. The outcome of this phase may be to cause the entering client devices to obtain insufficient passive ranging technique exchanges to compute its location, and switch to the active ranging technique (e.g., FTM) as a complement thus revealing entering client devices' presence, and providing the AP with a chance to request an LMR from the entering client devices.

From stage 210, where controller 110 divides coverage environment 105 into a plurality of areas, method 200 may advance to stage 220 where controller 110 may determine a corresponding plurality of accuracy gradients for each of the plurality of areas. For example, plurality of APs 120 may use LMR feedback, not only to determine the computed client device range to each AP, but also to determine an accuracy gradient for each of the plurality of areas of coverage environment 105. The accuracy gradient may comprise an accuracy probability range for each area. Controller 110 may parse the LMR feedback and compare it to infrastructure-based location calculations. The infrastructure-based location may use techniques comprising, but not limited to, Received Signal Strength Indicator (RSSI)-lateration, Angle of Arrival (AoA), and are accompanied with distance estimations. Cumulative measurements may indicate areas and directions where FTM performance may be poor.

Figures 3A, 3B, 3C:
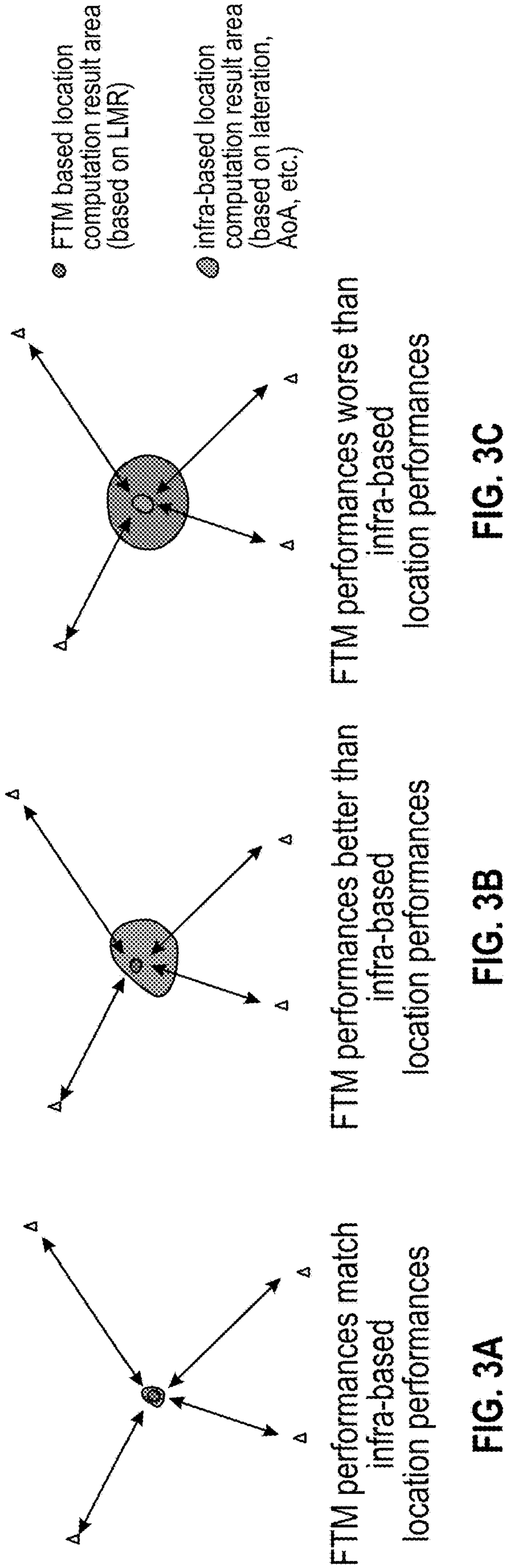
FIG. 3A, FIG. 3B, and FIG. 3C are diagrams that illustrate an accuracy gradient.

FIG. 3A, FIG. 3B, and FIG. 3C are diagrams that illustrate the accuracy gradient. FIG. 3A illustrates an area where the performance of the active ranging technique (i.e., FTM-based on LMR) matches the performance of infrastructure-based location techniques. FIG. 3B illustrates an area where the performance of the active ranging technique is better than the performance of infrastructure-based location techniques. FIG. 3C illustrates an area where the performance of the active ranging technique is worse than the performance of infrastructure-based location techniques. Infrastructure-based location techniques may be used over active ranging techniques (i.e., FTM-based on LMR) in areas where FTM-based techniques' performance is worse than Infrastructure-based location techniques (i.e., FIG. 3C).

Once controller 110 determines the corresponding plurality of accuracy gradients for each of the plurality of areas in stage 220, method 200 may continue to stage 230 where controller 110 may implement passive ranging for ones of the plurality of areas that have a high accuracy gradient and one of a high client device density and low client device movement. For example, in areas with a high accuracy gradient and high client device density, the infrastructure may switch to AP-to-AP ranging (passive ranging technique), thus enabling a large set of client devices to range without airtime consumption (e.g., without a negative impact on CU). These areas may be of low mobility and open space zones (e.g., auditoriums, lines at the entrance of a theater, etc.). In these areas, frequent individual client device location may not useful and may be detrimental to cell efficiency. In other words, active ranging may not be useful because client device movement may be slow either because the client devices are not mobile, or because the density causes a crowd flow, and most client devices move at the approximate mean pace of the flow. As such, individual client device movement may be extrapolated from the client device flow movement, and a subset of client devices may be queried at intervals to maintain awareness of the flow speed (in another embodiment, client device natural probes may be used and sufficient for this purpose). In high density areas, active ranging may be detrimental because the FTM exchanges, if left at their full individual density, may cause high CU for no useful (to the client device) data exchange. It may thus be better to reduce the FTM exchanges in these zones.

From stage 230, where controller 110 implements passive ranging for ones of the plurality of areas that have a high accuracy gradient and one of a high client device density and low client device movement, method 200 may advance to stage 240 where controller 110 may implement active ranging for ones of the plurality of areas that have a low client device density. For example, active ranging with low client device density may not cause high CU because there may be so few client derives. Also, the infrastructure may benefit from the data in the LMRs obtained in the FTM exchanges (i.e., active ranging) in these zones.

After controller 110 implements active ranging for ones of the plurality of areas that have a low client device density in stage 240, method 200 may proceed to stage 250 where controller 110 may switch, based on at least one of a level of client device density and movement speed of client devices, between passive ranging and active ranging for ones of the plurality of areas that have at least one of high client device density and high client device movement. For example, in transition areas (i.e., areas of client device movement), and (e.g., at intervals) in high density areas, the APs may reduce the AP-to-AP exchanges, causing the client devices to switch to active ranging. The APs use the LMR feedback IE to cause the client devices to return their LMRs. This process may be used in high density areas to maintain awareness of the client device flow. A speed gradient may be used to pace the interval (e.g., be a factor of average meters per second displacement between measurements for a given test client device). In one embodiment, test devices may be picked at random. A partially overlapping and rotating subset may be used to alleviate battery drain (e.g., intervals 1 to 5 using client devices 1-6, then intervals 6 to 10 using client devices 3-9, etc.) For these client devices, the AP (as a response station (RSTA)) may override the client device settings to force a longer burst count and duration. For other client devices, the AP may override the client device settings to force a shorter burst count and duration. This may be because the AP may know, and the client device may ignore that the current FTM burst is not the only source of measurement, as the passive ranging mode may resume right after the exchange set completes with the target number of test client devices.

In transition areas, the AP may pace the passive-to-active ranging mode transition and characteristics based on the client device density and movement speed. Higher client device density may cause smaller active FTM burst periods (i.e., longer passive periods) and vice versa. During the active ranging period, higher client device density may cause the AP to use smaller burst count and duration. Higher client device displacement speed may cause the AP to increase the active ranging period count and durations, and increase the burst counts during the active ranging periods, thus obtaining more samples over time and more LMRs. Once controller 110 switches, based on at least one of the level of client device density and the movement speed of client devices, between passive ranging and active ranging for ones of the plurality of areas that have at least one of high client device density and high client device movement in stage 250, method 200 may then end at stage 260.

Figure 4:
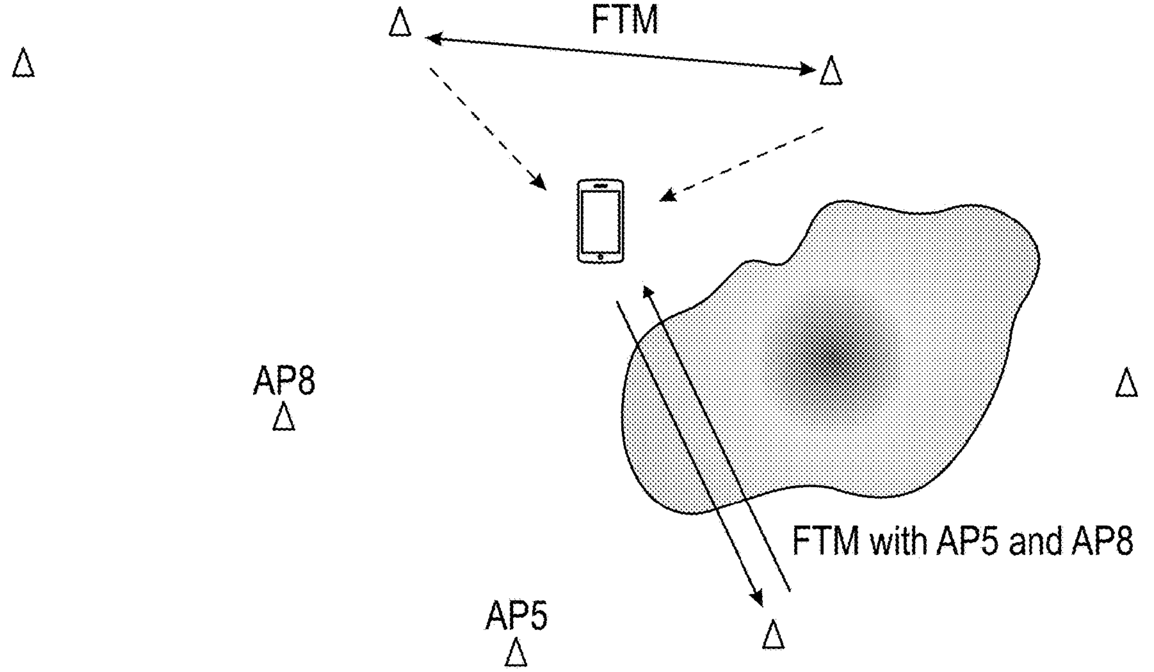
FIG. 4 is a diagram that illustrates improved accuracy by using suppression and redirection.
Figure 5:
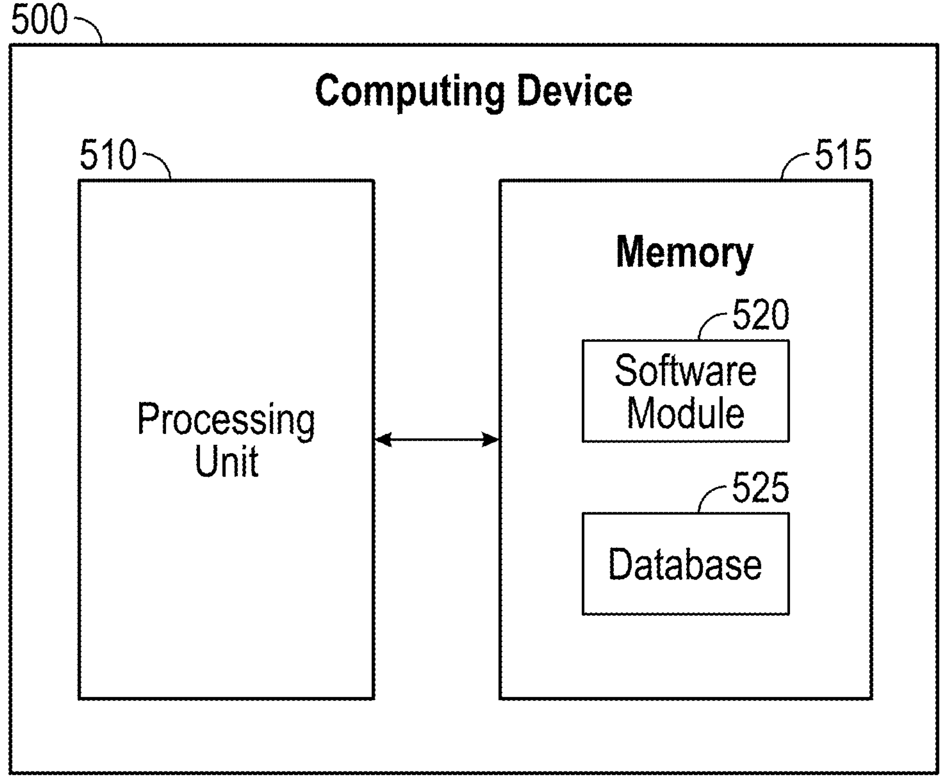
FIG. 5 is a block diagram of a computing device.

FIG. 4 is a diagram that illustrates improved accuracy by using suppression and redirection. As shown in FIG. 5, in areas with a low accuracy gradient and medium/low client device density, the APs may partially suppress the passive ranging mode in the direction of low accuracy. When the client device has switched to the active ranging mode to acquire more ranges, the queried AP may use measurement requests (e.g., 802.11k measurement requests) to redirect the client device to the channels, directions, and radios maximizing the location performances. The AP may adapt the FTM burst characteristics to the accuracy gradient, thus causing the client device to obtain ranging with shorter bursts in areas where accuracy is satisfactory.

The effect of such suppression and redirection may be an increased accuracy for the client device, with a lower ranging cost (e.g., less bursts, of shorter duration, passive ranging mode where possible). At the same time, the infrastructure (i.e., coverage environment 105) may benefit from the LMR feedback from the client device, including in regions where the client device could have solely used the passive ranging mode and thus shared no result with the infrastructure.

FIG. 5 shows computing device 500. As shown in FIG. 5, computing device 500 may include a processing unit 510 and a memory unit 515. Memory unit 515 may include a software module 520 and a database 525. While executing on processing unit 510, software module 520 may perform, for example, processes for providing hybrid ranging as described above with respect to FIG. 2. Computing device 500, for example, may provide an operating environment for controller 110, client device 115, or ones of plurality of APs 120. Controller 110, client device 115, and plurality of APs 120 may operate in other environments and are not limited to computing device 500.

Computing device 500 may be implemented using a Wi-Fi access point, a tablet device, a mobile device, a smart phone, a telephone, a remote control device, a set-top box, a digital video recorder, a cable modem, a personal computer, a network computer, a mainframe, a router, a switch, a server cluster, a smart TV-like device, a network storage device, a network relay devices, or other similar microcomputer-based device. Computing device 500 may comprise any computer operating environment, such as hand-held devices, multiprocessor systems, microprocessor-based or programmable sender electronic devices, minicomputers, mainframe computers, and the like. Computing device 500 may also be practiced in distributed computing environments where tasks are performed by remote processing devices. The aforementioned systems and devices are examples and computing device 500 may comprise other systems or devices.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to, mechanical, optical, fluidic, and quantum technologies. In addition, embodiments of the disclosure may be practiced within a general purpose computer or in any other circuits or systems.

Embodiments of the disclosure may be practiced via a system-on-a-chip (SOC) where each or many of the element illustrated in FIG. 1 may be integrated onto a single integrated circuit. Such an SOC device may include one or more processing units, graphics units, communications units, system virtualization units and various application functionality all of which may be integrated (or "burned") onto the chip substrate as a single integrated circuit. When operating via an SOC, the functionality described herein with respect to embodiments of the disclosure, may be performed via application-specific logic integrated with other components of computing device 500 on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. A method comprising:

dividing, by a computing device, a coverage environment into a plurality of areas;

determining a corresponding plurality of accuracy gradients of ranging for each of the plurality of areas;

implementing passive ranging for ones of the plurality of areas that have a high accuracy gradient of ranging and one of a high client device density and low client device movement;

implementing active ranging for ones of the plurality of areas that have a low client device density; and switching, based on at least one of a level of client device density and movement speed of client devices, between passive ranging and active ranging for ones of the plurality of areas that have at least one of high client device density and high client device movement.

2. The method of claim 1, wherein determining the corresponding plurality of accuracy gradients for each of the plurality of areas comprises comparing data obtained from Location Measurement Reports (LMRs) for each of the plurality of areas to infrastructure based location data for each of the plurality of areas.

3. The method of claim 1, wherein switching between passive ranging and active ranging comprises periodically determining a speed gradient for a set of client devices chosen randomly.

4. The method of claim 1, wherein switching between passive ranging and active ranging comprises periodically determining a speed gradient for sets of overlapping client devices.

5. The method of claim 1, wherein switching between passive ranging and active ranging comprises switching between passive ranging and active ranging wherein a time duration spent for passive ranging is directly proportional to the level of client device density.

6. The method of claim 1, wherein switching between passive ranging and active ranging comprises switching between passive ranging and active ranging wherein a time duration spent for active ranging is directly proportional to the movement speed of client devices.

7. The method of claim 1, further comprising causing Access Points (APs) on an outer edge of the coverage environment to perform passive ranging.

8. The method of claim 1, further comprising adapting Fine Time Measurement (FTM) burst characteristics for an Access Point (AP) based upon a one of the plurality accuracy gradients.

9. A system comprising:

a memory storage; and a processing unit, the processing unit coupled to the memory storage, wherein the processing unit is operative to:

divide a coverage environment into a plurality of areas, determine a corresponding plurality of accuracy gradients of ranging for each of the plurality of areas, implement passive ranging for ones of the plurality of areas that have a high accuracy gradient of ranging and one of a high client device density and low client device movement, implement active ranging for ones of the plurality of areas that have a low client device density, and switch, based on at least one of a level of client device density and movement speed of client devices, between passive ranging and active ranging for ones of the plurality of areas that have at least one of high client device density and high client device movement.

10. The system of claim 9, wherein the processing unit being operative to switch between passive ranging and active ranging comprises the processing unit being operative to periodically determine a speed gradient for a set of client devices chosen randomly.

11. The system of claim 9, wherein the processing unit being operative to switch between passive ranging and active ranging comprises the processing unit being operative to periodically determine a speed gradient for sets of overlapping client devices.

12. The system of claim 9, wherein the processing unit being operative to switch between passive ranging and active ranging comprises the processing unit being operative to switch between passive ranging and active ranging wherein a time duration spent for passive ranging is directly proportional to the level of client device density.

13. The system of claim 9, wherein the processing unit being operative to switch between passive ranging and active ranging comprises the processing unit being operative to switch between passive ranging and active ranging wherein a time duration spent for active ranging is directly proportional to the movement speed of client devices.

14. A computer-readable medium that stores a set of instructions which when executed perform a method executed by the set of instructions comprising:

dividing, by a computing device, a coverage environment into a plurality of areas;

determining a corresponding plurality of accuracy gradients of ranging for each of the plurality of areas;

implementing passive ranging for ones of the plurality of areas that have a high accuracy gradient of ranging and one of a high client device density and low client device movement;

implementing active ranging for ones of the plurality of areas that have a low client device density; and switching, based on at least one of a level of client device density and movement speed of client devices, between passive ranging and active ranging for ones of the plurality of areas that have at least one of high client device density and high client device movement.

15. The computer-readable medium of claim 14, wherein determining the corresponding plurality of accuracy gradients for each of the plurality of areas comprises comparing data obtained from Location Measurement Reports (LMRs) for each of the plurality of areas to infrastructure based location data for each of the plurality of areas.

16. The computer-readable medium of claim 14, wherein switching between passive ranging and active ranging comprises periodically determining a speed gradient for a set of client devices chosen randomly.

17. The computer-readable medium of claim 14, wherein switching between passive ranging and active ranging comprises periodically determining a speed gradient for sets of overlapping client devices.

18. The computer-readable medium of claim 14, wherein switching between passive ranging and active ranging comprises switching between passive ranging and active ranging wherein a time duration spent for passive ranging is directly proportional to the level of client device density.

19. The computer-readable medium of claim 14, wherein switching between passive ranging and active ranging comprises switching between passive ranging and active ranging wherein a time duration spent for active ranging is directly proportional to the movement speed of client devices.

20. The computer-readable medium of claim 14, further comprising adapting Fine Time Measurement (FTM) burst characteristics for an Access Point (AP) based upon a one of the plurality accuracy gradients.

* * * * *